United States Patent [19]

Suda et al.

[11] Patent Number: 4,828,373
[45] Date of Patent: May 9, 1989

[54] ASPHERICAL SINGLE LENS

[75] Inventors: Shigeyuki Suda, Tokyo; Masayuki Suzuki, Yokohama, both of Japan

[73] Assignee: Canon Kabushiki Kaisha, Tokyo, Japan

[21] Appl. No.: 110,581

[22] Filed: Oct. 16, 1987

Related U.S. Application Data

[63] Continuation of Ser. No. 6,286, Jan. 20, 1987, abandoned, which is a continuation of Ser. No. 677,091, Nov. 30, 1984, abandoned.

[30] Foreign Application Priority Data

Dec. 5, 1983 [JP] Japan ................................ 58-229540

[51] Int. Cl.$^4$ ......................... G02B 3/02; G02B 13/18
[52] U.S. Cl. .................................................... 350/432
[58] Field of Search ......................................... 350/432

[56] References Cited

U.S. PATENT DOCUMENTS

| | | | |
|---|---|---|---|
| 4,415,238 | 11/1983 | Braat et al. | 350/432 |
| 4,449,792 | 5/1984 | Arai | 350/432 |
| 4,657,352 | 4/1987 | Suda, et al. | 350/432 |
| 4,765,725 | 8/1988 | Suda | 350/432 |

FOREIGN PATENT DOCUMENTS 0076512 5/1982 Japan .................................. 350/432

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

An aspherical single lens of compact construction and good image-forming performance which is obtained by shaping the first surface into such an aspherical configuration the curvature radius of which increases gradually toward the periphery from the center while satisfying the following conditions:

$$0.42 < q < 1.3 \quad \text{(a)}$$

and $$0.5(f-1) < d < 1.2f \quad \text{(b)}$$

wherein, $q = -r_1/r_2$, $r_1$ is the curvature radius in the vicinity of the optical axis of the first surface, $r_2$ is the curvature radius of the second surface, f is the focal length and d is the thickness of the lens.

4 Claims, 1 Drawing Sheet

ASPHERICAL SINGLE LENS

This application is a continuation-in-part of application Ser. No. 006,286 filed Jan. 20, 1987, which is a continuation of application Ser. No. 677,091, filed Nov. 30, 1984, each now abandoned.

BACKGROUND OF THE INVENTION

1. Field of the Invention

The present invention relates to an objective lens for use in video disk, audio disk, and optical memory apparatus and the like, and especially relates to an aspherical single lens having a numerical aperture (NA) of about 0.5 and corrected regarding aberrations on and near the optical axis.

2. Description of the Prior Art

Conventionally the objective lens for the optical memory and the similar applications has been composed of three, four or five spherical lenses as disclosed, for example, in Japanese Patent Publication No. 44,209/1977 and Japanese Laid-Open Patent Application No. 148,143/1977.

The objective lens useful for the above applications is required not only to have high image-forming performance but also to be small and light. The compact structure (small size and light weight) is essential for following the automatic focusing and tracking control at high speed. The prior art objective lens composed of a spherical lens group comprising three to five component lenses is too heavy to satisfy the above requirement for compact construction. Furthermore, since it is a composite lens, it needs a very laborious and time-consuming produce for assembly and adjustment of the optical axis and lens-to-lens distances, which increases the manufacturing cost of the lens very much.

In order to solve the problem it has recently been proposed to use an aspherical single lens as the objective lens for optical memory. Examples of such aspherical single lens are those proposed in Japanese Laid-Open Patent Application Nos. 64,714/1982, 201,210/1982, 17,409/1983, and 68,711/1983 and U.S. Pat. No. 4,449,792. These prior art aspherical single lenses may be classified into two groups, one of which is of the type having two aspherical surfaces and the other of which is of the type having only one aspherical surface. The first type of aspherical lens whose surfaces are both aspherical is naturally more difficult to make than the second type which is aspherical on one side only. Therefore it is desirable to use the second type of aspherical single lens.

However, the single lenses having only one aspherical surface proposed by the above-mentioned prior inventions are unsatisfactory as the objective lens for optical memory in view of image-forming performance as well as compactness.

SUMMARY OF THE INVENTION

Accordingly, the object of the present invention is to provide a single lens which is aspherical on one side only, and compact in construction and yet excellent in image-forming performance.

The object is attained by an aspherical single lens according to the invention in which the first surface of the lens is aspherical and the second surface is spherical, and the first aspherical surface has such configuration that the radius of curvature becomes gradually longer toward the periphery from the center while satisfying the following conditions:

$$0.42 < q < 1.3 \quad \text{(a)}$$

$$0.5(f-1) < d < 1.2\,f \quad \text{(b)}$$

wherein, $q = -r_1/r_2$ wherein $r_1$ is the curvature radius in the vicinity of the optical axis of the first aspherical surface, and $r_2$ is the curvature radius of second spherical surface;

f is the focal length of the lens and d is the lens thickness.

The lens according to the present invention is a lens aberration-corrected mainly regarding aberrations in the area around the optical axis. It is suitable for the above-mentioned applications. For example, the lens according to the invention may be used as an objective lens for optical memory of the type in which the lens itself is moved for tracking.

When the lens of the invention is used as an objective lens for optical memory, the lens is so set that its spherical surface faces the disk. On the contrary, if it is used as a collimator for a semiconductor laser, the lens is so set that its aspherical surface faces the semiconductor laser.

Under the above-defined conditions, the lens according to the present invention may be variously designed taking into consideration the expected recording density, the required reading performance, the possible inclination of the disk, etc. Generally, a transparent substrate of 1.1 to 1.5 mm thick is provided as a protecting layer for protecting the optical recording medium against dust and scratches. Preferably the numerical aperture (NA) of the lens is in the range of from 0.45 to 0.55 and the area in which the lens should be abberation-corrected is in the range of from 0.1 to 0.2 mm $\phi$. Within this area the lens has a high image-forming performance near the limit of diffraction through the transparent substrate. Theoretically speaking, the aberration-corrected area of the lens may be only a point on the optical axis. However, in practice, there may be some errors in the direction of incident beam, in machining, finishing and/or setting of the lens. In order to allow these errors to a reasonable extent, the above range of aberration-corrected area is preferred. The lens thickness d may be suitably selected considering the limitation on size, the levels of remaining aberrations and working distance (W.D.). Generally the preferred range for lens thickness d is 2 to 8 mm. As the light source there may be used a semiconductor laser having a wavelength $\lambda$ in the range of from 0.78 to 0.84 $\mu$m.

The present invention will be described in further detail with reference to preferred embodiments thereof. In the following description:

f is the focal length of the lens, d is the thickness of the lens, $r_1$ is the curvature radius of the first surface in the vicinity of the optical axis of the lens, $r_2$ is the curvature radius of the second surface of the lens, n is the refractive index of the lens, t is the thickness of the transparent substrate for protecting the optical recording medium, W.D. is the working distance, NA is the numerical aperture of the lens, λ is the wavelength of the light source; and the configuration of the lens surface is represented, on an x-y coordinate system by $$X = (H^2/r)/(1 + \sqrt{1 - (1 + K)(H/r)^2}) +$$
$$BH^4 + CH^6 + DH^8 + EH^{10} +$$
$$A'|H|^3 + B'|H|^5 + C'|H|^7 + D'|H|^9$$

which represents the amount of change at H of the y-coordinate, providing that $r_1$ is the curvature radius at the point intersecting the optical axis, the x-axis is on the optical axis and extends in the same direction as the light runs and the y-axis is perpendicular to the x-axis and extends passing through the apex of the surface.

DESCRIPTION OF THE PREFERRED EMBODIMENTS

Figure 1:
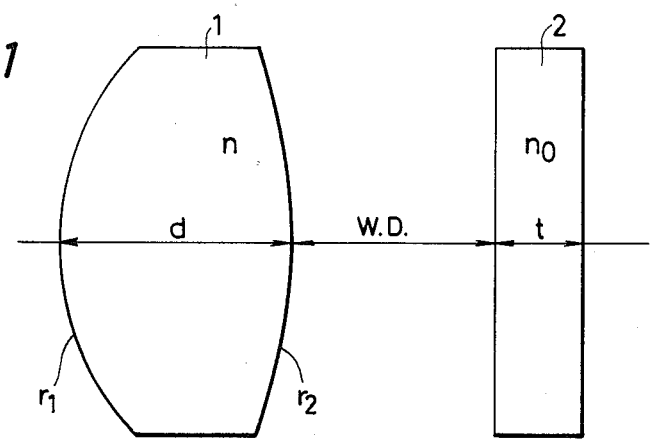
FIG. 1 is a sectional view of an embodiment of the aspherical single lens according to the invention.

In making the lens of the invention, it is required to correct mainly spherical aberration and coma aberration including the transparent substrate 2 for protecting the recording medium. Further, the aspherical single lens 1 of the invention must be formed to give the first surface an aspherical configuration in which the radius of curvature becomes gradually longer toward the periphery from the center while satisfying the following conditions:

$$0.42 < q < 1.3 (q = -r_1/r_2)$$

and $$0.5(f-1) < d < 1.2f.$$

When one designs an aspherical lens presupposing the introduction of an aspherical surface, it is possible to correct the coma aberration including that of the protective transparent substrate layer by the spherical bending on one hand while eliminating the remaining spherical aberration by the aberration correcting effect of the aspherical surface on the other hand. The requirements for it can be found out by calculating the tertiary aberration in accordance with the teachings shown in literature, for example, in "Method of Lens Design" by Yoshiya Matsui, published by the Kyoritsu Publisher company in Japan.

For the correction of coma aberration it is desirable that the position of the pupil be in the lens itself. In other words it is desirable to correct the coma aberration in the area in which the pupil in substance is the lens per se. It is particularly preferable to select the first surface of the lens for entrance pupil because it makes the calculation easier. In the above-referred "Method of Lens Design" on page 96, Y. Matsui made a teaching that for a lens having spherical aberration it is not always necessary that the lens per se become the pupil but the coma aberration can be eliminated by providing an iris diaphragm separately from the lens and shifting the position of entrance pupil by moving the diaphragm. However, this technique for the correction of aberration needs a particular iris diaphragm and also the increase of effective diameter of the lens itself, which is against the purpose of compact construction of the lens.

For the lens according to the invention, the bending factor q is defined by $-r_1/r_2$. The refractive index of lens materials commonly used is in the range of 1.45 to 1.85. When one makes from the material a lens whose NA is about 0.5 and whose thickness is about 0.5(f-1), the lower limit of the conditional formula (b) which is the minimum thickness required to obtain the necessary edge thickness, the bending factor q will generally be a positive value, that is, a convex shape. In this case, if the value of q is smaller than 0.42 which means the selection of larger refractive power for the first surface, then the working distance WD available is too short to be acceptable. This is particularly true for a small type of lens having a short focal length. On the contrary, if q is larger than 1.3, then it is no longer possible to adequately correct the coma aberration. The aberration-corrected area of the lens is remarkedly reduced and the image-forming performance of the lens is rendered poor. The lowering of performance resulting from under-correction of coma aberration becomes very remarkable when a larger refractive index is selected. For these reasons the condition (a) is given by the present invention. The same is applicable also to the condition (b). If the lens thickness d exceeds the upper limit, 1.2f, then it is no longer possible to adequately correct the coma aberration, which results in a lens of poor optical performance. This tendency is more remarkable with increases in the refractive index. For this reason the upper limit of the conditional formula (b) is determined by the present invention.

When the first surface is so formed as to provide such an aspherical surface the curvature radius of which increases gradually toward the periphery from the center while satisfying the above conditions (a) and (b), there is obtained a high performance objective lens for optical memory which is adequately aberration-corrected regarding not only coma aberration but also spherical aberration which is apt to be more under-corrected for a larger numerical aperture NA. The single lens according to the present invention which is aspherical on the first surface side and spherical on the second surface side is better than the single lens which is aspherical on both sides in respect of eccentrical error. Thus, the former is of the type superior than the latter in view of machinability.

In order to illustrate the invention the following examples are given wherein $r_1$ is the radius of curvature in the vicinity of the optical axis of the first, aspherical lens surface, $r_2$ is the radius of curvature of the second, spherical surface, d is the thickness, n is the refractive index of the lens to the wavelength of 800 nm, W.D. is the working distance and f is the focal length of the lens. In all of the examples there have been used the same wavelength λ=800 nm, numerical aperture NA=0.5, disk thickness t=1.1 mm, disk refractive index $n_0(\lambda = 800$ nm$) = 1.48550$ and object distance $S_1 = -\infty$.

In order to represent the configuration of the respective aspherical surfaces of the examples the following equation has been used on the basis of a rotation-symmetric quadratic curved surface plotted in a coordinate system the origin of which is the apex of the curved surface and the x-axis extends along the optical axis of the lens:

$$X\nu = \frac{H\nu^2/r\nu}{1 + \sqrt{1 - (1 + k\nu)(H\nu/r)^2}} +$$

$$B\nu \cdot H\nu^4 + C\nu \cdot H\nu^6 + D\nu \cdot H\nu^8 + E\nu \cdot H\nu^{10} +$$

$$A'\nu \cdot H\nu^3 + B'\nu \cdot H\nu^5 + C'\nu \cdot H\nu^7 + D'\nu \cdot H\nu^9$$

$(\nu = 1.2)$ wherein, H is the height of incidence and k is a constant of spherical cone.

The above equation contains the terms up to the tenth power of the incidence height H. This limitation on the number of the degrees is only for the sake of convenience. It is never limitative.

EXAMPLE 1 (* IS THE ASPHERICAL SURFACE)

| | | | |
|---|---|---|---|
| $f$ | = 2.4 | | |
| $r_1$* | = 1.72141 | $r_2$ | = −2.46064 |
| $d$ | = 1.67312 | $n$ | = 1.48550 |
| W.D | = 0.89713 | | |
| $q$ | = 0.70 | | |
| $K_1$ | = 0.0 | $A_1'$ | = +7.93719 × 10$^{-3}$ |
| $B_1$ | = −5.01791 × 10$^{-2}$ | $B_1'$ | = −5.51441 × 10$^{-3}$ |
| $C_1$ | = +9.53794 × 10$^{-3}$ | $C_1'$ | = +1.21890 × 10$^{-2}$ |
| $D_1$ | = −2.11462 × 10$^{-2}$ | $D_1'$ | = −6.48145 × 10$^{-3}$ |
| $E_1$ | = +6.13507 × 10$^{-3}$ | | |

EXAMPLE 2 (* IS THE ASPHERICAL SURFACE)

| | | | |
|---|---|---|---|
| $f$ | = 5.4 | | |
| $r_1$* | = +5.61768 | $r_2$ | = −8.07264 |
| $d$ | = 5.60000 | $n$ | = 1.74298 |
| W.D | = 2.36490 | | |
| $q$ | = 0.70 | | |
| $K_1$ | = 0.0 | $A_1'$ | = +6.84299 × 10$^{-7}$ |
| $B_1$ | = −1.07398 × 10$^{-3}$ | $B_1'$ | = +8.16323 × 10$^{-6}$ |
| $C_1$ | = −4.48446 × 10$^{-5}$ | $C_1'$ | = −3.20393 × 10$^{-7}$ |
| $D_1$ | = −1.78746 × 10$^{-6}$ | $D_1'$ | = +2.33931 × 10$^{-8}$ |
| $E_1$ | = −1.55246 × 10$^{-8}$ | | |

EXAMPLE 3 (* IS THE ASPHERICAL SURFACE)

| | |
|---|---|
| f = 4.77351 | |
| $r_1$* = 3.00000 | $r_2$ = −7.02852 |
| d = 2.84637 | n = 1.48550 |
| W.D = 2.355280 | |
| q = 0.43 | |
| $K_1$ = 0.0 | $A_1'$ = +6.30196 × 10$^{-4}$ |
| $B_1$ = −4.93745 × 10$^{-3}$ | $B_1'$ = +2.44753 × 10$^{-5}$ |
| $C_1$ = −2.48547 × 10$^{-4}$ | $C_1'$ = −1.64517 × 10$^{-5}$ |
| $D_1$ = −2.26207 × 10$^{-5}$ | $D_1'$ = +1.46862 × 10$^{-6}$ |
| $E_1$ = −5.57363 × 10$^{-6}$ | |

Figure 2:
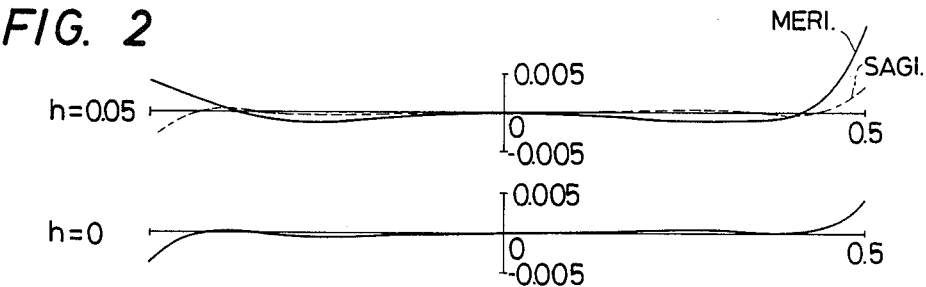
FIGS. 2, 3 and 4 show lateral aberrations of the first, second and third examples of the aspherical single lens respectively.
Figure 3:
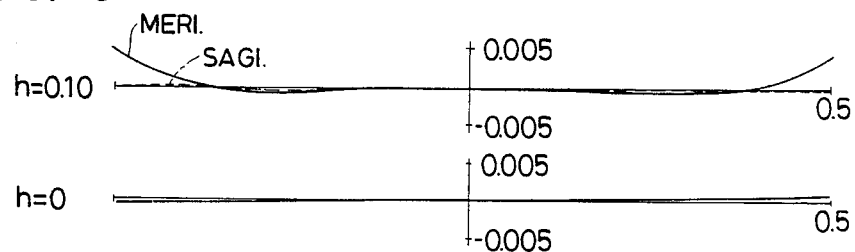
Figure 4:
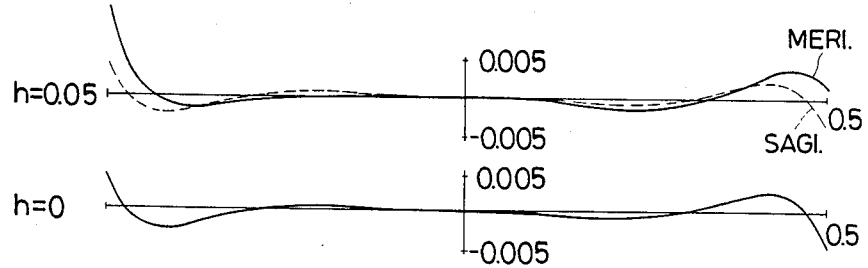

The lateral aberrations of the above examples 1, 2 and 3 are shown in FIGS. 2, 3 and 4 of the accompanying drawing, respectively.

We claim:

1. An aspherical single lens for use as an objective lens of an optical memory, comprising:
   a first surface of aspherical configuration, said first surface being configured in such a manner that a radius of curvature thereof increases gradually toward the periphery from the area in the vicinity of the optical axis; and
   a second surface of spherical configuration on an opposite side from said first surface, wherein said second surface is positioned to face an object to which a light beam is directed through said objective lens, and satisfying the following conditions:

$0.42 < q < 1.3$, where $q = -r_1/r_2$, and $0.5(f-1) < d < 1.2f$ wherein
   $r_1$ is the curvature radius in the vicinity of the optical axis of the first surface;
   $r_2$ is the curvature radius of the second surface;
   f is the focal length of the lens; and
   d is the lens thickness on axis.

2. An aspherical single lens according to claim 1, further comprising a pupil located in a range where the lens exists.

3. An aspherical single lens for imaging a light beam emitted from a semiconductor laser on an optical information recording medium, passing through a transparent substrate having a thickness of 1.1–1.5 mm., comprising:
   a first surface of aspherical configuration, said first surface being configured in such a manner that a radius of curvature thereof increases gradually toward the periphery from the area in the vicinity of the optical axis; and
   a second surface of spherical configuration on the opposite side of said first surface, wherein said second surface is positioned to face an object to which a light beam is directed through said objective lens, and satisfying the following conditions:

$0.42 < q < 1.3$, where $q = -r_1/r_2$, and $0.5(f-1) < d < 1.2f$ wherein
   $r_1$ is the curvature radius in the vicinity of the optical axis of the first surface;
   $r_2$ is the curvature radius of the second surface;
   f is the focal length of the lens; and
   d is the lens thickness on axis.

4. An aspherical single lens according to claim 3, further comprising a pupil located in a range where the lens exists.

* * * * *

UNITED STATES PATENT AND TRADEMARK OFFICE
CERTIFICATE OF CORRECTION

PATENT NO. : 4,828,373
DATED : May 9, 1989
INVENTOR(S) : Suda, et al.

It is certified that error appears in the above-identified patent and that said Letters Patent is hereby corrected as shown below:

ON THE TITLE PAGE

[57] Abstract:

Lines 10 and 11, "is the... surface $r_2$" (in italics, should not be in italics).

COLUMN 1:

Line 4, "continuation-in-part" should read --continuation--.

Line 34, "produce" should read --procedure--.

Line 62, "and compact" should read --and yet compact--, and delete "yet".

COLUMN 2:

Line 32, delete "of".

Line 37, "abbera-" should read --aberra- --.

COLUMN 3:

Line 3, "system" should read --system,--.

UNITED STATES PATENT AND TRADEMARK OFFICE
CERTIFICATE OF CORRECTION

PATENT NO. : 4,828,373
DATED : May 9, 1989
INVENTOR(S) : Suda, et al.

It is certified that error appears in the above-identified patent and that said Letters Patent is hereby corrected as shown below:

COLUMN 4:

Line 67, "x-axis" should read --x-axis of which--.

COLUMN 5:

Example 3, line 4, "W.D = 2.355280" should read --W.D. = 2.55280--.

Signed and Sealed this

Eighteenth Day of February, 1992

Attest:

HARRY F. MANBECK, JR.

*Attesting Officer*      *Commissioner of Patents and Trademarks*